July 11, 1961 R. E. WALKER 2,991,894
SPARE TIRE CARRIERS

Filed Jan. 5, 1959 5 Sheets-Sheet 1

INVENTOR
RONALD E. WALKER
BY- *Smart & Biggar*
ATTORNEYS

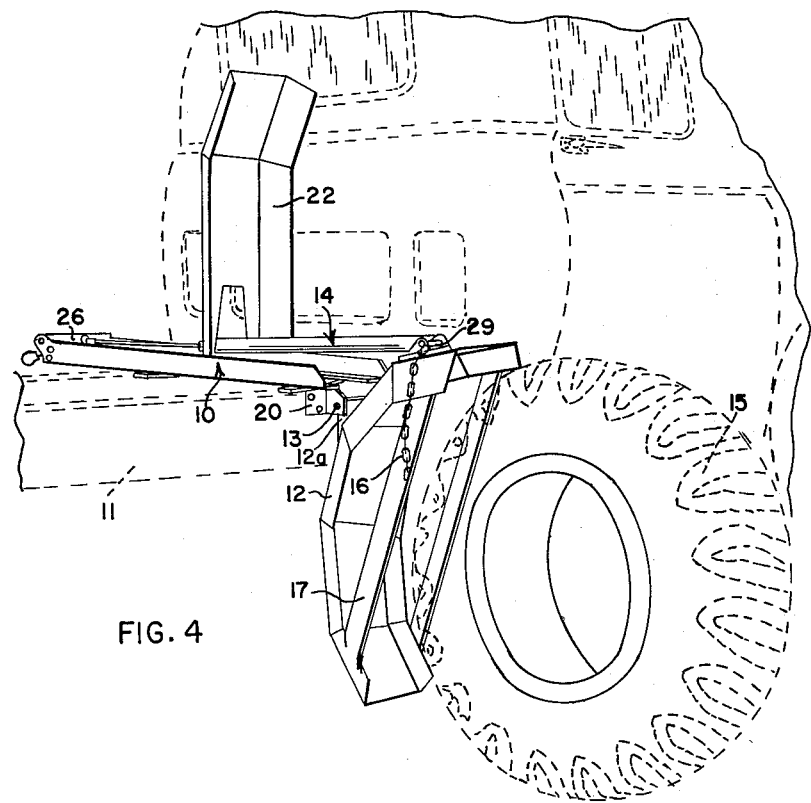

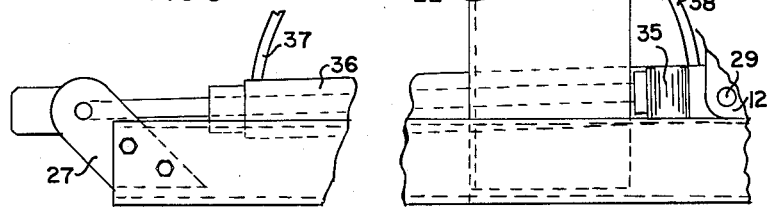
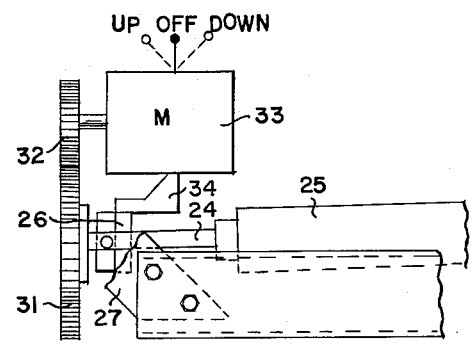

2,991,894
Patented July 11, 1961

2,991,894
SPARE TIRE CARRIERS
Ronald E. Walker, Windsor, Ontario, Canada, assignor to Phil Wood Industries, Limited, Windsor, Ontario, Canada
Filed Jan. 5, 1959, Ser. No. 784,991
3 Claims. (Cl. 214—454)

This invention relates to spare tire carriers adapted to be mounted on vehicles.

It is an object of the present invention to reduce the manual labour involved in loading and unloading a spare tire to and from its transport position on a vehicle and to enable these operations to be carried out by one man, even with the heaviest tires.

According to the present invention there is provided a spare tire carrier comprising a cradle adapted to be pivotally mounted on a vehicle, means associated with the cradle for releasably retaining a tire thereon, and mechanism for effecting up and down swinging movement of the cradle to raise a spare tire from ground level to a transport position on the vehicle or to lower the tire from its transport position to ground level when desired.

The cradle and the mechanism for effecting up and down swinging movement thereof may be mounted on a frame adapted to be rigidly mounted on a vehicle. Said mechanism may comprise a screw member anchored to a horizontal cross bar pivoted on the frame and cooperating with a cylinder having means adapted for threaded engagement with said screw member, said cylinder being open at one end to receive the screw member and pivoted at its other end to the cradle at a point remote from the pivotal connection between the frame and the cradle. Said screw member may be adapted for manual operation or may be driven from a reversible electric motor.

Alternatively, said mechanism may comprise a double-acting piston and cylinder assembly pivotally connected at one end to the frame and at the other end to the cradle at a point remote from the pivot connection between the frame and the cradle. Said piston and cylinder assembly may be adapted to be actuated from the vehicle power plant or simply by a hand pump.

An embodiment of the invention will now be described by way of example with reference to the accompanying drawings in which:

FIGURE 4 is a perspective view similar to FIGURE 3 but showing the tire removed from the cradle of the carrier;

FIGURE 5 is a diagrammatic view of an embodiment utilizing a piston and cylinder assembly; and FIGURE 6 is a view similar to FIGURE 5 of another embodiment utilizing an electric motor.

Figure 1:
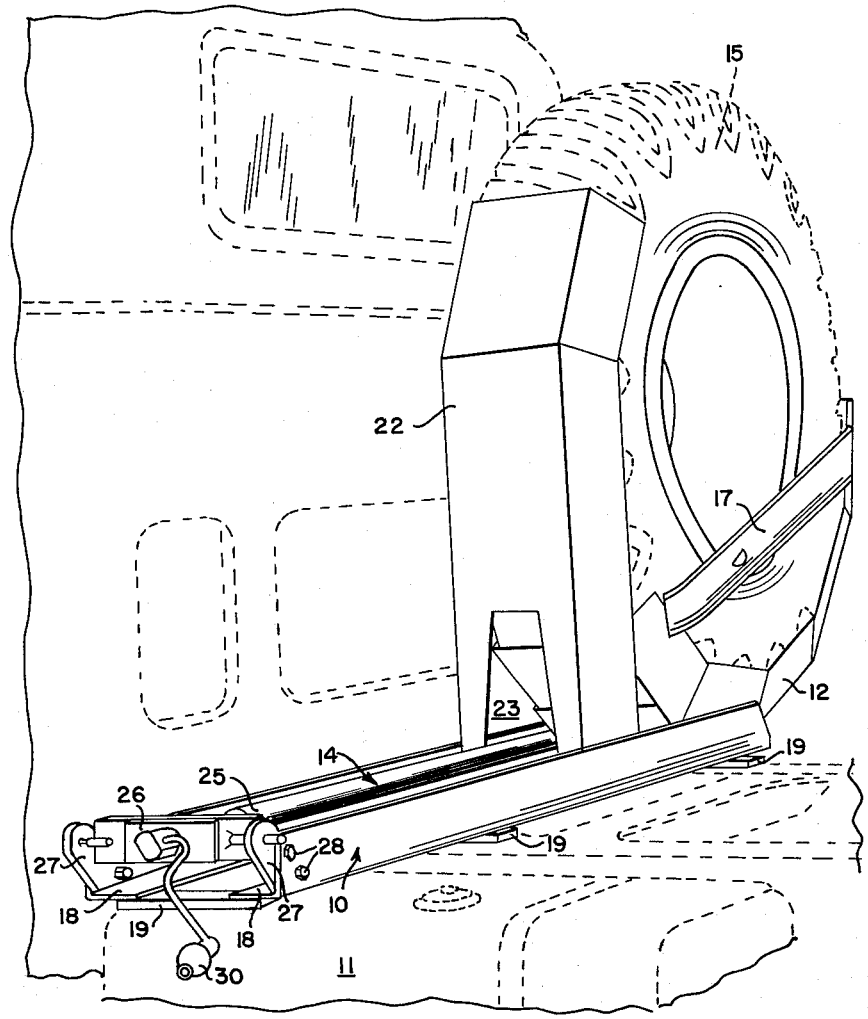
FIGURE 1 is a perspective view of part of a vehicle having the spare tire carrier rigidly mounted thereon, with the tire in its transport position.

The carrier comprises a frame 10 rigidly mounted on the vehicle 11, a cradle 12 pivoted by means of apertured lugs 12a to one end of the frame on pivot pins 13, and mechanism 14 for effecting up and down swinging movement of the cradle 12. The lugs 12a are welded or otherwise secured to the outer periphery of the cradle, one at each side, with the apertures in the lugs alined.

Figure 2:
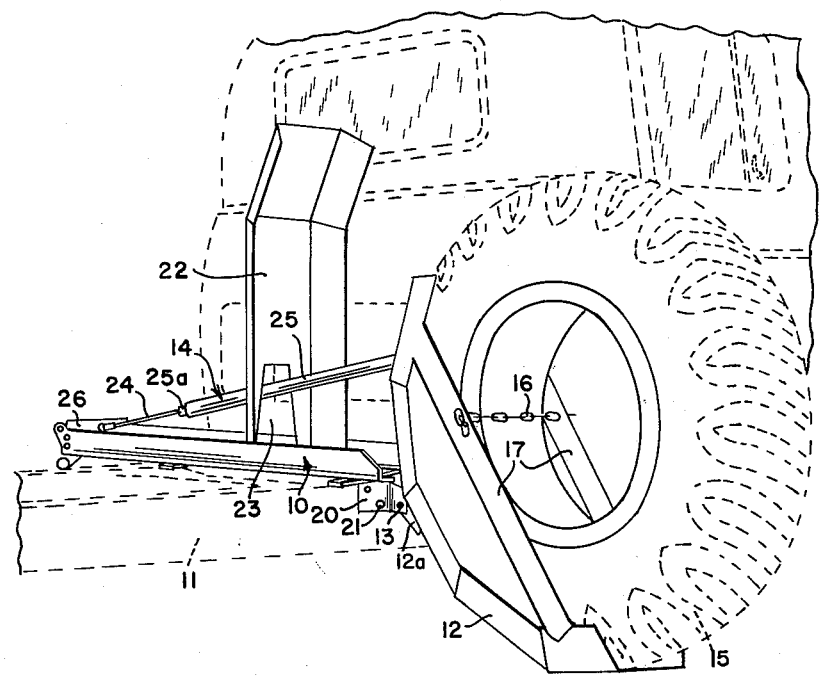
FIGURE 2 is a perspective view from the other side of the vehicle and showing the tire in an intermediate position.
Figure 3:
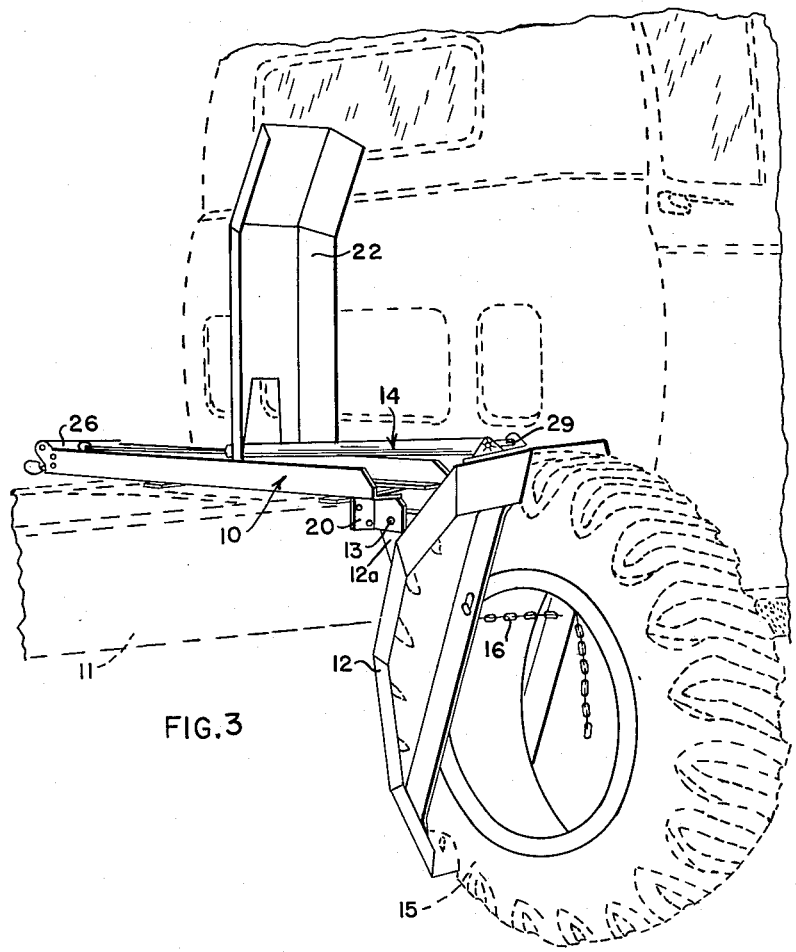
FIGURE 3 is a perspective view similar to FIGURE 2 but showing the tire at ground level.

As is clearly shown in FIGURE 2, the cradle 12 is adapted for releasably retaining a spare tire 15, the tire being held in position by a chain 16 extending between two side spars 17 of the cradle. The chain is rigidly secured to one of the spars and extends through a hole in the other spar, a padlock or the like being used to lock the chain releasably in the position shown.

In the embodiment illustrated, the frame 10 comprises a pair of opposed angle irons 18 interconnected at spaced intervals by cross members 19 welded to the underside of the horizontal flanges of the angle irons. The cross members 19 are bolted to the chassis of the vehicle. A bracket 20 is welded to the underside of each angle iron 18 and is bolted to the chassis of the vehicle by bolts 21, the opposed brackets serving as a mounting for pivot pin 13. An upstanding post 22 of substantially channel section is welded on top of angle irons 18 and has a slot 23 at its lower end through which the mechanism 14 extends, the slot being vertically elongated to allow for the vertical displacement of the mechanism during lowering and raising of the cradle. As shown in FIGURE 1 the tire is held in its transport position between the cradle 12 and the post 22.

The mechanism 14, as shown in FIGURES 1 to 4 of the drawings, comprises a screw member 24 and a cylinder 25 cooperating therewith. The cylinder 25 may be tapped along at least a portion of its length to cooperate with screw member 24 or an internally threaded cylindrical plug 25a may be provided in the open end of the cylinder. The screw member is anchored to a cross bar 26 pivotally mounted on brackets 27 bolted to the frame 10 by bolts 28. The cylinder is pivotally connected at the end thereof to the cradle 12 as indicated by reference numeral 29. The screw member 24 has a handle 30, the mechanism illustrated being adapted for manual operation.

The operation of unloading a spare tire will now be described with reference to the drawings. In FIGURE 1 the spare tire is shown in its transport or loaded position. In this position the mechanism 14 lies substantially horizontally and the pivot 29 is disposed above and to the left of pivot 13 as viewed from the rear of the vehicle. Turning of the handle 30 effects relative movement between the screw member 24 and the cylinder 25 and the cradle 12 commences to swing about pivot 13 as a result of the push exerted by the cylinder 25 on the cradle. As shown in FIGURE 2, the mechanism 14 is raised at one end by the swinging movement of the cradle 12, the pivotal mounting of cross bar 26 allowing such raising to take place without the application of bending forces to the mechanism 14. The tire is prevented from rolling out of the cradle 12 by the chain 16. Continued turning of the handle 30 lowers the cradle and the tire to the position shown in FIGURE 3, where it will be seen that the mechanism 14 again lies substantially horizontally. It will be seen that the tire is now resting on the ground and it is a simple matter to release the chain 16 and roll the tire away from the cradle 12 as shown in FIGURE 4.

The loading of a spare tire is accomplished by a complete reversal of the above described operation.

It will be manifest that various modifications of the device described above may be envisaged without departing from the scope of the present invention. For example, as shown in FIGURE 6, the screw member 24 may be driven through a gear train 31, 32 by a reversible electric motor 33, preferably mounted on the cross-bar 26 by a bracket 34. Furthermore, the mechanism 14 need not comprise a screw member and cooperating tapped cylinder but may be any suitable mechanism which will impart the desired swinging movement to the cradle 12, as shown in FIGURE 5. For example, a double-acting piston and cylinder assembly may be used, such assembly comprising a piston 35 anchored to the cross-bar 26, a cylinder 36 pivotally connected to the cradle 12 at 29, and hydraulic fluid feed lines 37, 38 communicating the ends of cylinder 36 with any suitable pump (not shown). The pump may be driven from the vehicle power plant or may be a simple hand pump.

What I claim as my invention is:

1. A spare tire carrier comprising a frame adapted to be mounted transversely on a truck at the rear of the driver's cabin, a cradle of substantially arcuate shape and channel section swingably mounted on one end of said frame about a horizontal axis extending longitudinally of the truck, means associated with the cradle for releasably retaining a tire thereon, actuating mechanism for effecting swinging movement of the cradle when desired, and an upstanding post of substantially channel section mounted on said frame, said cradle and said post cooperating in the uppermost position of the cradle to clamp a tire in its transport position and said cradle being releasably held in its tire clamping position by said actuating mechanism, said mechanism comprising a screw member anchored to a horizontal cross bar pivoted on the frame and cooperating with a cylinder having means adapted for threaded engagement with said screw member, said cylinder being open at one end to receive the screw member and pivoted at its other end to the cradle at a point remote from the pivotal connection between the frame and the cradle.

2. A spare tire carrier as claimed in claim 1, in which said screw member is driven by a reversible electric motor adapted to derive its power from the vehicle battery.

3. A spare tire carrier comprising a frame adapted to be mounted transversely on a truck at the rear of the driver's cabin, a cradle of substantially arcuate shape and channel section swingably mounted on one end of said frame about a horizontal axis extending longitudinally of the truck, means associated with the cradle for releasably retaining a tire thereon, actuating mechanism for effecting swinging movement of the cradle when desired, and an upstanding post of substantially channel section mounted on said frame, said cradle and said post cooperating in the uppermost position of the cradle to clamp a tire in its transport position and said cradle being releasably held in its tire clamping position by said actuating mechanism, said mechanism comprising a double-acting piston and cylinder assembly pivotally connected at one end to the frame and at the other end to the cradle at a point remote from the pivotal connection between the frame and the cradle.

References Cited in the file of this patent

UNITED STATES PATENTS

| | | |
|---|---|---|
| 1,808,983 | Hebeler | June 9, 1931 |
| 2,274,440 | Tozier | Feb. 24, 1942 |
| 2,377,149 | Heil | May 29, 1945 |